United States Patent
Takada

[19]

[11] Patent Number: 6,098,435
[45] Date of Patent: Aug. 8, 2000

[54] METHOD AND SYSTEM FOR DETERMINING BENDING ORDER ADAPTED FOR USE IN BENDING MACHINE

[75] Inventor: Masaaki Takada, Ishikawa, Japan

[73] Assignees: Komatsu Ltd.; Komatsu Industries Corporation, both of Tokyo, Japan

[21] Appl. No.: 09/077,302
[22] PCT Filed: Jan. 23, 1997
[86] PCT No.: PCT/JP97/00177
  § 371 Date: Jun. 2, 1998
  § 102(e) Date: Jun. 2, 1998
[87] PCT Pub. No.: WO97/30803
  PCT Pub. Date: Aug. 28, 1997

[30] Foreign Application Priority Data

Feb. 23, 1996 [JP] Japan .................................. 8-036824

[51] Int. Cl.⁷ .................................................. B21C 51/00
[52] U.S. Cl. ...................... 72/31.11; 72/16.2; 72/17.3; 72/389.3; 72/379.2
[58] Field of Search .................. 364/468.01, 468.09, 364/476.01; 72/389.1, 389.3, 379.2, 16.2, 16.8, 16.9, 18.6, 18.8, 31.1, 31.11, 17.1, 17.2, 17.3, 18.9, 20.1

[56] References Cited

U.S. PATENT DOCUMENTS

| | | | |
|---|---|---|---|
| 5,367,902 | 11/1994 | Kitabayashi et al. ................... | 72/389.3 |
| 5,377,516 | 1/1995 | Lapari ........................................ | 72/37 |
| 5,483,750 | 1/1996 | Ooenaki et al. ........................ | 72/389.1 |
| 5,587,914 | 12/1996 | Conradson et al. ............... | 364/468.01 |
| 5,704,238 | 1/1998 | Tokai ...................................... | 72/31.11 |
| 5,812,406 | 9/1998 | Matsumoto et al. ..................... | 72/17.2 |
| 5,813,263 | 9/1998 | Tokai ...................................... | 72/21.4 |

FOREIGN PATENT DOCUMENTS

| | | |
|---|---|---|
| 6-142768 | 5/1994 | Japan . |
| 7-314043 | 12/1995 | Japan . |

*Primary Examiner*—Ed Tolan
*Attorney, Agent, or Firm*—Nikaido Marmelstein Murray & Oram LLP

[57] ABSTRACT

A bending order which provides a highest possible bending accuracy is determined. First a bending order generating section generates a plurality of bending orders possible for bending operation. Then, whether the bend angle of each bend can be measured in each generated bending order is checked by a measurement judging section. For each bend which has been determined as an objective bend "impossible to measure", a reference bend whose correction value for a die driving amount is to be used for calculating a correction value for the objective bend is set by a correction condition setting section. Weighting is carried out by a weight setting section based on the degree of the correlation between the processing factors of the objective bend and the processing factors of its associated reference bend, and the weights assigned to all the objective bends are summed by a weight sum computing section. Thereafter, a bending order selecting section evaluates the respective weight sums of the bending orders to select a suitable bending order and outputs the evaluation result to an NC device.

4 Claims, 9 Drawing Sheets

BENDING STEPS (ORDER)

BENDING STEPS (ORDER)

BENDING STEPS (ORDER)

BENDING STEPS (ORDER)

METHOD AND SYSTEM FOR DETERMINING BENDING ORDER ADAPTED FOR USE IN BENDING MACHINE

TECHNICAL FIELD

The present invention relates to a method and system for determining a bending order to achieve high bending accuracy in producing a plurality of bends in a workpiece, the method and system being well adapted for use in a bending machine in which a correction value for a die driving amount with respect to a first bend is obtained based on measurements of the bend angle thereof and a correction value for a die driving amount with respect to a second bend is calculated from the correction value for the first bend.

BACKGROUND ART

A known bending machine such as press brakes controls the driving amount of a movable die with an NC device according to various kinds of input information to bend a sheet-like workpiece. However, such die driving amount control cannot always avoid errors in bend angle because of variations in the thickness and properties of workpieces to be bent and in processing conditions. One attempt to solve this problem is designed such that the bend angle of the workpiece is measured during the bending process and the driving amount for the die is corrected based on the in-process measurements thereby to ensure high bending accuracy.

When forming a workpiece into particular shapes, bending machines equipped with such a bend angle measuring means are unable to perform bend angle measurement or encounters difficulties in measurement. In these cases, the bending machines fail in eliminating errors in bend angle.

With a view to overcoming the foregoing drawback, the applicant of the present invention has proposed an automatic die driving amount correction method in Japanese Patent Unexamined Publication No. 7-314043 (1995), according to which a correction value for a die driving amount with respect to a first bend is obtained based on measurements of the bend angle thereof and a correction value for a die driving amount with respect to a second bend is calculated from the correction value for the first bend. This correction method makes it possible to ensure high bending accuracy even if the workpiece has bends the angles of which are difficult or impossible to measure and eliminates the need for conducting angle measurement each time when a bend is produced so that significant savings in processing time can be achieved.

The above automatic die driving amount correction method reveals a problem, that is, its inapplicability to some bends if bending order is not appropriately determined when producing a plurality of bends in a workpiece. In addition, since the bending accuracy of the second bend varies depending on the degree of the correlation between the first and second bends in terms of their processing factors, the highest possible accuracy cannot be achieved with some bending orders.

SUMMARY OF THE INVENTION

The invention is directed to overcoming the above problem and one of the objects of the invention is therefore to provide a method and system for determining a bending order to achieve bending accuracy as high as possible in forming a plurality of bends with a bending machine in which if one of the bends has an angle difficult or impossible to measure, a correction amount for this bend is calculated from a correction amount for another bend which has been obtained based on bend angle measurements. Herein, the bend (i.e., first bend) whose correction value for a die driving amount is obtained from measurements of its bend angle is called "reference bend", while the bend (i.e., second bend) whose correction value is calculated from the correction value of the reference bend is called "objective bend".

According to the invention, there is provided a bending order determining method for a bending machine wherein a correction value for a die driving amount with respect to a reference bend is obtained based on measurements of the bend angle of the reference bend and a correction value for a die driving amount with respect to an objective bend is calculated from the correction value for the reference bend, in producing a plurality of bends in a workpiece, the method comprising selecting a suitable bending order from a plurality of bending orders possible for bending operation, based on evaluation of the bending accuracies of objective bends to be formed in each bending order, the evaluation being carried out with a specified measure.

The invention is directed to selecting a suitable bending order from a plurality of possible bending orders according to the result of evaluation of the respective bending accuracies of bends produced in each of the possible bending orders, the evaluation being made based on a specified measure. Each bend evaluated is an objective bend to be formed with a correction value for a die driving amount which is calculated from a correction value for a die driving amount for a reference bend which is calculated based on measurements of the bend angle of the reference bend. According to the invention, a suitable bending order for achieving the highest possible bending accuracy is thus determined from a plurality of possible bending orders, based on the evaluation of the bending accuracies of bends produced in each of the possible bending orders, which contributes to an improvement in the accuracy of the bending operation.

Preferably, the evaluation with a specified measure is carried out such that a weight is assigned to the bending accuracy of each of the objective bends formed in each bending order, based on the degree of the correlation between the processing factors of the objective bend and the processing factors of its associated reference bend, and then the weights assigned to all the objective bends with respect to each bending order are summed to obtain an evaluation value for each bending order. This enables high-accuracy bending operation because the evaluation of the bending accuracies of bends produced in each bending order is carried out in consideration of the degree of the correlation between objective and reference bends in terms of processing factors. In this case, the suitable bending order to be selected is preferably a bending order which has the best evaluation value.

According to the invention, there is provided a bending order determining system for a bending machine wherein a correction value for a die driving amount with respect to a reference bend is obtained based on measurements of the bend angle of the reference bend and a correction value for a die driving amount with respect to an objective bend is calculated from the correction value for the reference bend, in producing a plurality of bends in a workpiece, the system comprising:

(a) bending order generating means for generating a plurality of bending orders possible for bending operation;

(b) measurement judging means for checking whether bend angle measurement can be made for each bend in each bending order generated by the bending order generating means;

(c) correction condition setting means for setting a reference bend for each bend which has been determined by the measurement judging means as an objective bend the bend angle of which is impossible to measure;

(d) evaluation value computing means for computing an evaluation value for each bending order in such a way that the bending accuracy of each objective bend determined to be impossible to measure is assigned a weight, based on the degree of the correlation between the processing factors of the objective bend and its associated reference bend set by the correction condition setting means and the weights assigned to all the objective bends are summed to obtain the evaluation value; and (e) bending order selecting means for selecting a suitable bending order from the plurality of bending orders based on the evaluation values computed by the evaluation value computing means.

According to the invention, a suitable bending order is selected from a plurality of possible bending orders through the following procedure. A plurality of bending orders possible for bending operation are first generated and then a judgement is made to check whether the bend angle of each bend can be measured in each possible bending order. For each objective bend, that is, the bend which has been determined to be "impossible to measure", a reference bend is set, the reference bend having a correction value for a die driving amount which is to be used for calculating a correction value for a driving amount for its associated objective bend. Thereafter, based on the degree of the correlation between the processing factors of the objective bend and the processing factors of its associated reference bend which has been set, the bending accuracy of the objective bend is weighted. Sequentially, the weights assigned to all the objective bends of each bending order are summed to obtain an evaluation value for the bending order. Based on the evaluation values of all the possible bending orders thus determined, a suitable bending order is finally selected. In this way, the bending accuracy of each bending order is evaluated in consideration of the correlation between bends in terms of processing factors. This brings about easy input of step data into the NC device and increases the accuracy of the bending operation. In this case, it is desired that the bending order selecting means select a bending order having the best evaluation value as the suitable bending order.

BEST MODE FOR CARRYING OUT THE INVENTION

With reference to the drawings, there will be explained a method and system for determining a bending order adapted for use with a bending machine, according to a preferred embodiment of the invention.

Figure 1:
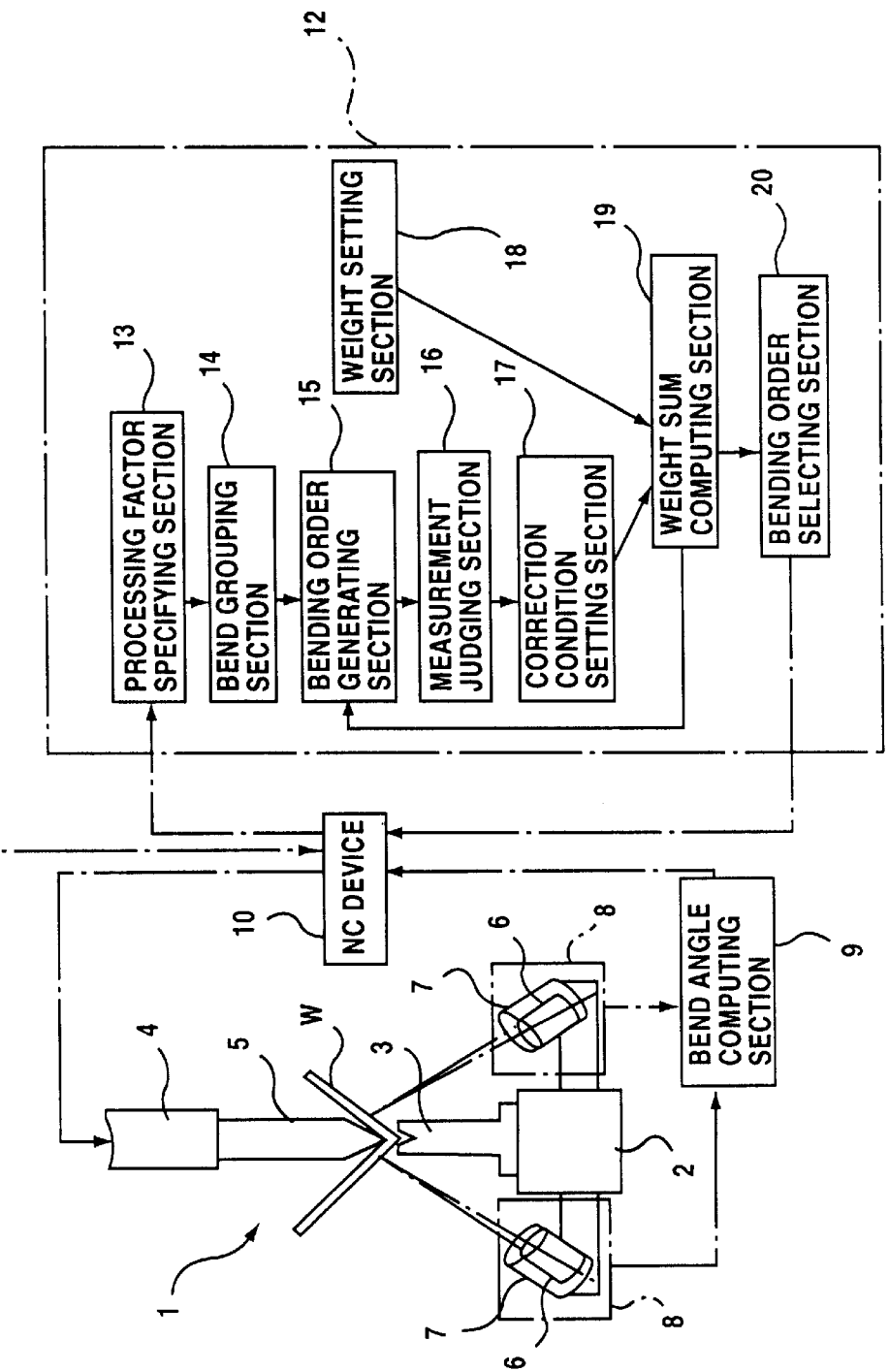
FIG. 1 is a diagram of a system structure designed according to one embodiment of the invention.

FIG. 1 shows a system structure according to one embodiment of the invention.

In the present embodiment, a press brake 1 comprises a lower die (die) 3 supported on a mount 2 and an upper die (punch) 5 that is arranged in opposing relationship with the lower die 3, being attached to the underside of a ram 4. The ram 4 is so disposed as to be lifted and lowered above the lower die 3. Inserted between the lower die 3 and the upper die 5 is a workpiece W formed from a metal sheet. Bending of the workpiece W is performed by lowering the ram 4 to press the workpiece W placed on the lower die 3 with both lower and upper dies 3, 5.

In front of the mount 2 (i.e., on the user side) and behind the mount 2 (i.e., on the machine side), there are provided angle measuring units 8 each comprising a slit-shaped light source 6 for projecting a linear light image onto the outer surface of the bent workpiece W and a CCD camera 7 for picking up the linear light image formed by the light source 6. The angle measuring units 8 measure the bend angle of the workpiece W. Such an angle measuring unit 8 may be positioned in front of or behind the mount 2 only.

The image picked up by the CCD camera 7 is displayed on a monitor television (not shown) while it is processed as image data in a bend angle computing section 9. The bend angle computing section 9 computes the bend angle of the workpiece W and the result of this arithmetic operation is input into an NC device 10. Apart from this measurement data representative of the bend angle of the workpiece W, the NC device 10 inputs, beforehand, workpiece information (material, the length of a bend line, bend angle, etc.), die information (die height, V-groove width, V-angle, punch R, etc.) and machine information (rigidity, speed specification, stroke specification, etc.).

The NC device 10 computes a reference lower limit of the stroke of the ram 4 (i.e., reference bend depth) based on input data such as the aforesaid workpiece information, die information, and machine information, and based on the result of this arithmetic operation, the ram 4 is controlled to perform the bending operation. During the bending operation, the actual bend angle of the workpiece W is calculated in the bend angle computing section 9 and the result is input into the NC device 10. Based on this input data, the NC device 10 calculates a correction value (depth correction value) for the lower limit of the ram 4 and this depth correction value is added to the aforesaid reference bend depth to obtain a final bend depth. According to the final bend depth thus obtained, the ram 4 is driven.

Figure 2A:
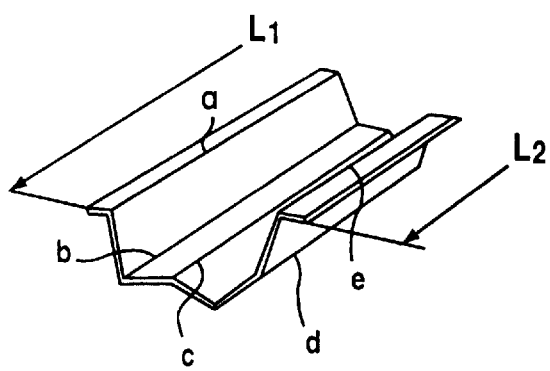
FIGS. 2(a) and 2(b) are, a perspective view and end view respectively, showing one example of workpieces processed in the embodiment.
Figure 2B:
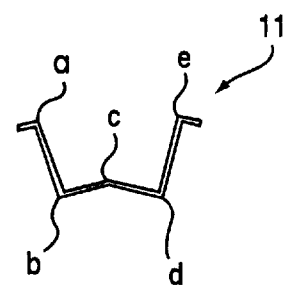
Figure 3:
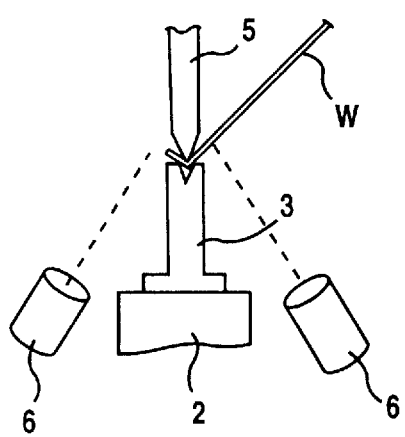
FIG. 3 shows one example of cases where bend angle measurement cannot be made.
Figure 4:
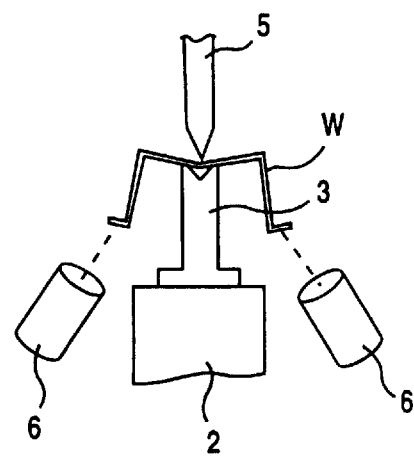
FIG. 4 shows another example of cases where bend angle measurement cannot be made.

In actual bending operation, there are some bends for which bend angle measurement cannot be made. For example, when producing a bent article 11 having a plurality of bends a to e as shown in FIG. 2, bend angle measurement cannot be made for some bends since (i) both surfaces which form the bend (i.e., the faces on both sides of the bend line) in the workpiece W cannot be measured (see FIG. 3) or (ii) slit lights from the light sources 6 cannot reach the measuring points (see FIG. 4). Whether bending angle measurement is possible for each bend does not depend on the shape of the bent article 11 but depends on the bending order, that is, the order of producing bends. A depth correction value for a bend for which bend angle measurement is impossible must be calculated from data on another bend for which bend angle measurement has been made. Therefore, the present embodiment includes a bending order determining system 12 (see FIG. 1) for selecting a suitable bending order which provides a high bending accuracy from a plurality of possible bending orders according to a specified evaluation measure. The arithmetic data produced by the bending order determining system 12 is input into the NC device 10.

The bending order determining system 12 comprises (a) a processing factor specifying section 13 for specifying processing factors for grouping by selecting from the data sent from the NC device 10, the processing factors being data that influence the bend angle of the workpiece W such as a target bend angle, the length of a bend line ($L_1$, $L_2$), the geometry of the upper die (punch R, angle, height, shape), and the geometry of the lower die (V-width, V-angle, height); (b) a bend grouping section 14 for grouping bends according to the processing factors specified by the processing factor specifying section 13; (c) a bending order generating section 15 for generating bending orders possible for bending operation; (d) a measurement judging section for checking whether bend angle measurement can be made for each bend in each bending order generated by the bending order generating section 15; (e) a correction condition setting section 17 for setting a reference bend for each bend which has been determined by the measurement judging section as an objective bend the bend angle of which is impossible to measure, in order that a correction value for a die driving amount for the reference bend is to be used to calculate a correction value for a die driving amount for its associated objective bend; (f) a weight setting section 18 for assigning a weight to each objective bend, based on the degree of the correlation between the processing factors of the objective bend and the processing factors of the reference bend set by the correction condition setting section 17; (g) a weight sum computing section 19 for calculating the sum of the weights assigned to all the objective bends according to outputs from the correction condition setting section 17 and from the weight setting section 18; and (h) a bending order selecting section 20 for selecting a suitable bending order from the plurality of possible bending orders by evaluating the weight sums of the plurality of possible bending orders calculated by the weight sum computing section 19. The bending order selecting section 20 releases output data to the NC device 10 and a display unit (not shown) incorporated in the NC device 10 displays the suitable bending order.

Figure 5:
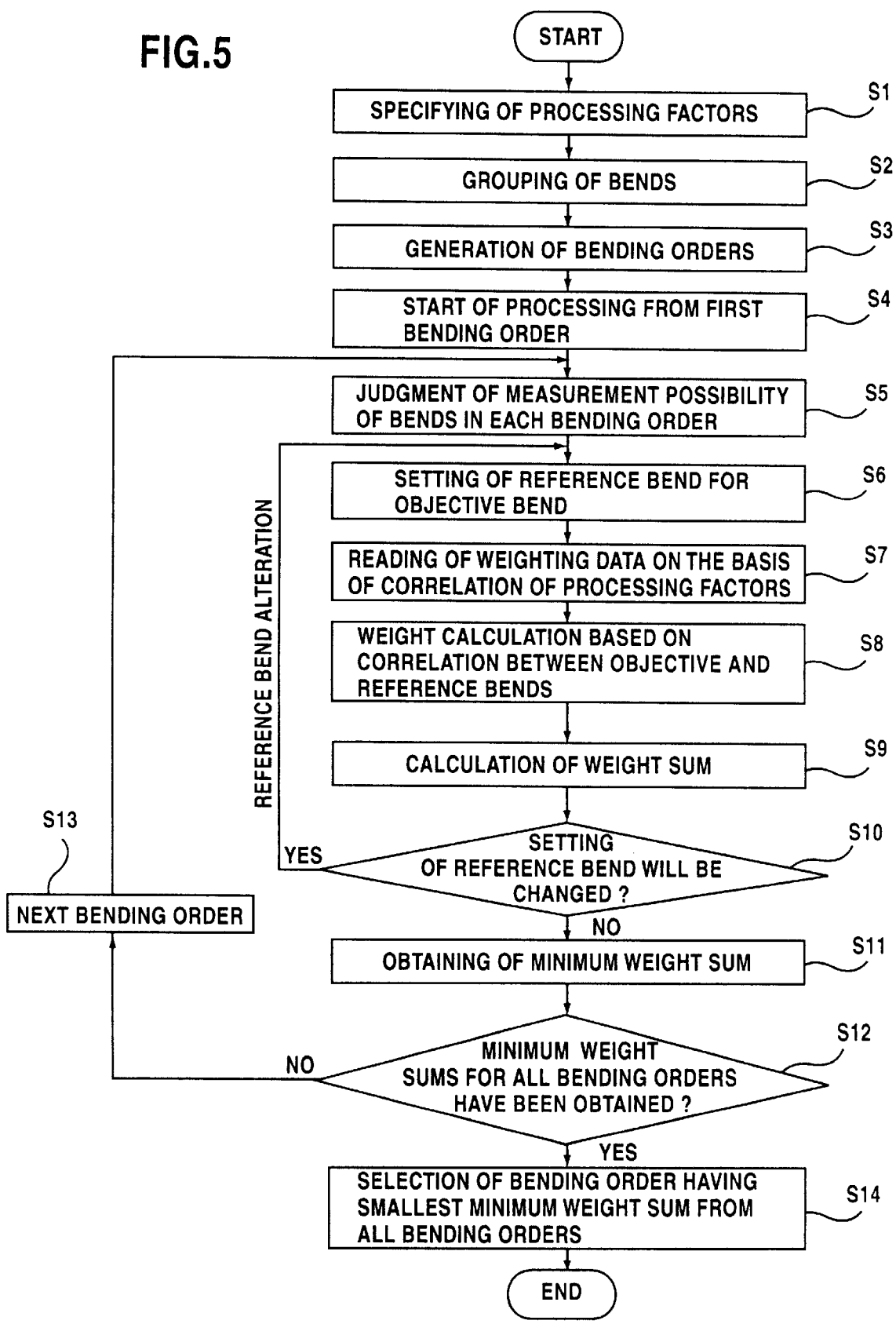
FIG. 5 is a flow chart of processing performed by a bending order determining system.

Next, the flow of processing performed by the bending order determining system 12 will be explained with reference to the flow cart of FIG. 5.

S1: The processing factor specifying section 13 specifies processing factors that influence bend angle (e.g., target bend angle, the length of a bend line, the geometry of the upper die and the geometry of the lower die).

S2: The bends of an article are classified into groups by the bend grouping section 14. Taking the bent article 11 shown in FIG. 2 for example, the bends are classified into three groups, namely, GROUP (G1) constituted by the bends a, b; GROUP (G2) constituted by the bend c; and GROUP (G3) constituted by the bends d, e. Specifically, the bends a, b have the same target bend angle and the same bend line length $L_1$. The bends d, e also have the same target bend angle and the same bend line length $L_2$. When weighting (described later) is carried out, a weight is obtained from the correlation between two groups made by the above classification. This arrangement facilitates weighting calculation even if there exist many bends which have the same correlation with their associated bends. It should be noted that such classification is not essential but may be omitted.

Figure 6:
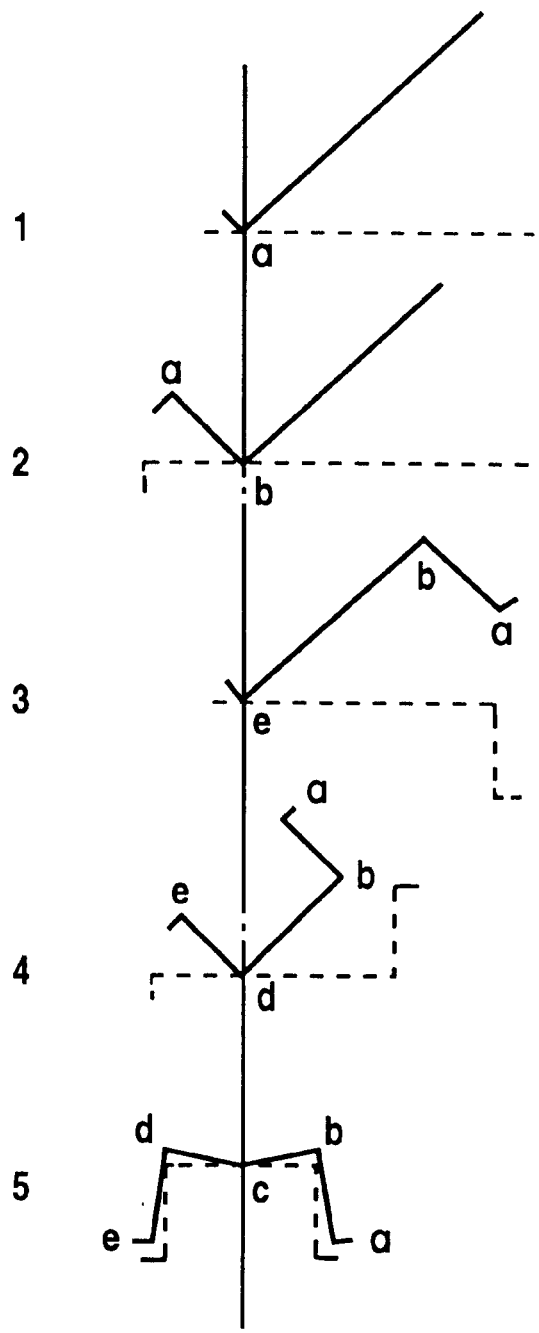
FIG. 6 shows one example of bending orders possible for bending the workpiece shown in FIG. 2.
Figure 7:
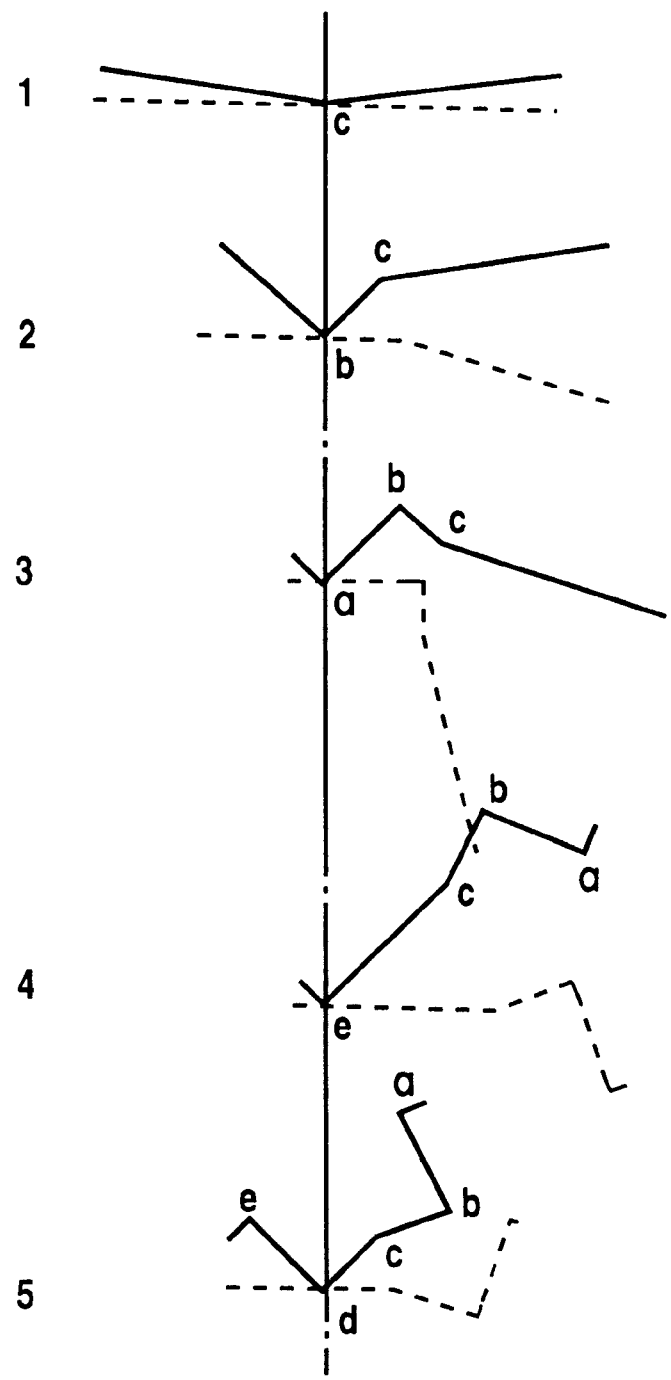
FIG. 7 shows another example of bending orders possible for bending the workpiece shown in FIG. 2.

S3 to S4: The bending order generating section 15 generates a plurality of bending orders possible for bending operation and the following processing is sequentially performed on each bending order. By way of example, bending orders for the bent article 11 shown in FIG. 2 are shown in FIGS. 6 and 7. For simplicity of explanation, the two kinds of bending orders shown in FIGS. 6 and 7 are evaluated in this flow. First, processing is performed on the bending order of FIG. 6.

S5: The measurement judging means 16 makes a check to determine whether the angle of each bend can be measured in the bending order of FIG. 6. In this case, it is determined that accurate bend angle measurement cannot be made in Bending Step 1 (i.e., the bend a) and Bending Step 3 (i.e., the bend e) because both surfaces which constitute the bend a or e cannot be measured. Also, Bending Step 5 (i.e., the bend c) is determined to be "impossible to measure" for the reason that slit lights from the light sources 6 cannot reach the measuring points of the bend c.

TABLE 1

| BENDING STEP (ORDER) | BEND | TARGET BEND ANGLE | BEND LINE LENGTH | GROUP | MEASUREMENT | REFERENCE BENDING STEP SETTING PROCESS I | | REFERENCE BENDING STEP SETTING PROCESS II | |
|---|---|---|---|---|---|---|---|---|---|
| | | | | | | REFERENCE BENDING STEP | WEIGHT | REFERENCE BENDING STEP | WEIGHT |
| 1 | a | 90° | 700 | G1 | IMPOSSIBLE | NONE | 100 | NONE | 100 |
| 2 | b | 90° | 700 | G1 | POSSIBLE | BENDING STEP OF ITSELF | 0 | BENDING STEP OF ITSELF | 0 |
| 3 | e | 90° | 500 | G3 | IMPOSSIBLE | BENDING STEP 2 | 2 | BENDING STEP 2 | 2 |
| 4 | d | 90° | 500 | G3 | POSSIBLE | BENDING STEP OF ITSELF | 0 | BENDING STEP OF ITSELF | 0 |

TABLE 1-continued

| BENDING STEP (ORDER) | TARGET BEND | BEND ANGLE | BEND LINE LENGTH | GROUP | MEASUREMENT | REFERENCE BENDING STEP SETTING PROCESS I | | REFERENCE BENDING STEP SETTING PROCESS II | |
|---|---|---|---|---|---|---|---|---|---|
| | | | | | | REFERENCE BENDING STEP | WEIGHT | REFERENCE BENDING STEP | WEIGHT |
| 5 | c | 150° | 700 | G2 | IMPOSSIBLE | BENDING STEP 2 | 60 | BENDING STEP 4 | 60 + 2 |
| | | | | | | SUM OF WEIGHTS | 162 | | 164 |
| | | | | | | | | MINIMUM WEIGHT SUM | 162 |

S6: The correction condition setting section 17 sets a reference bending step for each bending step which has been determined as an objective bending step for which bend angle measurement is impossible (Bending Steps 1, 3 and 5 are objective bending steps in this embodiment). In this example, there is no bend for which bend angle measurement is made prior to Bending Step 1 and therefore the column "REFERENCE BENDING STEP" in "REFERENCE BENDING STEP SETTING PROCESS I" of TABLE 1 corresponding to Bending Step 1 appears to be "NONE". Regarding Bending Steps 3 and 5, the column "REFERENCE BENDING STEP" in "REFERENCE BENDING STEP SETTING PROCESS I" appears to be "Bending Step 2".

S7: The weight setting section 18 reads preset weighting data based on the degree of the correlation between objective and reference bends in terms of processing factors (target bend angle, bend line length, upper die geometry, lower die geometry, etc.). This preset weighting data is experimental data prepared in such a way: bending operation is performed with various degrees of the correlation between the processing factors of a reference bending step and the processing factors of an objective bending step and the extent of an error in the bend angle in the objective bending step of each case is taken as data. TABLE 2 shows one example of the preset weighting data. In TABLE 2, the weight is set to increase as the extent of the error increases. In other words, the weight increases as the accuracy of bending based on a calculated correction value decreases. Since an error in bend angle is greater than an error in bend line length, the weight assigned to target bend angle is set greater than the weight assigned to bend line length. Here, the weight is set to 100 when there is no correlation (that is, an objective bending step does not have its associated reference bending step). The weight for the correlation between objective and reference bending steps in terms of target bend angle is set to be equal to the difference between the target bend angle of the reference bending step and the target bend angle of the objective bending step, whereas the weight for the correlation in terms of bend line length is set to be equal to the ratio between the bend line length of the reference bending step and the bend line length of the objective bending step.

TABLE 2

| CORRELATION OF PROCESSING FACTORS | WEIGHT | NOTE |
|---|---|---|
| NONE (NO REFERENCE BENDING STEP IS SET) | 100 | |
| TARGET BEND ANGLE | THE VALUE OF $\|\theta° - \theta'°\|$ (EXAMPLE: WHEN $\theta = 100°$ AND $\theta' = 90°$, THE VALUE IS 10) | $\theta'°$: TARGET BEND ANGLE OF OBJECTIVE BENDING STEP $\theta°$: TARGET BEND ANGLE OF REFERENCE BENDING STEP |
| BEND LINE LENGTH | | |
| RH = 1 | 0 | RH = $L_2/L_1$ or $L_1/L_2$ |
| 1 < RH ≦ 2 | 2 | $L_2$ = BEND LINE LENGTH OF OBJECTIVE BENDING STEP |
| 2 < RH ≦ 3 | 3 | $L_1$ = BEND LINE LENGTH OF REFERENCE BENDING STEP |
| . | . | |
| . | . | |
| . | . | |

S8 to S9: The weight sum computing section 19 calculates a weight for each objective bending step from the correlation between the objective bending step and the associated reference bending step and sums weights for all the bending steps. In the case of TABLE 1, Bending Step 1 does not have an associated reference bending step and therefore the weight to be assigned to Bending Step 1 is 100. Regarding Bending Step 3, the ratio of the bend line length of the reference step (i.e., Bending Step 2) for Bending Step 3 to the bend line length of Bending Step 3 is 700/500=1.2 so that the weight for Bending Step 3 is 2. Regarding Bending Step 5, the difference in target bend angle between Bending Step 5 and its associated reference bending step (i.e., Bending Step 2) is 150°−90°=60° and therefore the weight for Bending Step 5 is 60. Accordingly, the sum of the weights assigned to all the bending steps is 100+2+60=162.

S10: If setting of a reference bending step is changed, the program returns to step S6 and another setting process different from REFERENCE BENDING STEP SETTING PROCESS I, that is, REFERENCE BENDING STEP SETTING PROCESS II is carried out. According to REFERENCE BENDING SETTING PROCESS II, Bending Steps 1 to 4 respectively have the same associated reference bending steps as those in REFERENCE BENDING STEP SETTING PROCESS I but Bending Step 5 has, as its associated reference bending step, Bending Step 4 which differs from that of SETTING PROCESS I. A weight to be assigned to Bending Step 5 is similarly calculated according to REFERENCE BENDING STEP SETTING PROCESS II. Concretely, the ratio of the bend line length of Bending Step 5 to the bend line length of Bending step 4 is 700/500=1.2 and the difference in target bend angle between these steps is 150°−90°=60° so that the weight is 2+60=62. The sum of all the weights is 100+2+62=164.

S11: The minimum weight sum is selected from the respective weight sums of the reference bending step setting processes. In this example, the minimum weight sum is 162 because 162<164.

S12 to S13: If the minimum weight sums of all the bending orders have not been obtained yet, the program performs the processing of Step S5 and onward on the next bending order. For example, when the next bending order is as shown in FIG. 7, four kinds of reference bending step setting processes are adapted (see TABLE 3) and calculation of weights is carried out for each of REFERENCE BENDING STEP SETTING PROCESSES I to IV in the same way as described earlier. As a result, the weight sums of REFERENCE BENDING STEP SETTING PROCESSES I, II, III, IV are 2, 62, 62 and 122, respectively and the minimum weight sum is accordingly 2.

incorporated in the NC device 10. In one example of displaying methods, all the bending orders may be displayed on one display screen in the order of their increasing minimum weight sums. Alternatively, one bending order is displayed on one screen and the screens each having one bending order appear in the order of the increasing minimum weight sums whenever the operator switches, by depressing a button. In both cases, the operator looks at the display and proceeds operation according to the steps indicated by the NC device 10. It should be noted that the operator can select other bending orders than the bending order selected through the calculation.

Figure 8A:
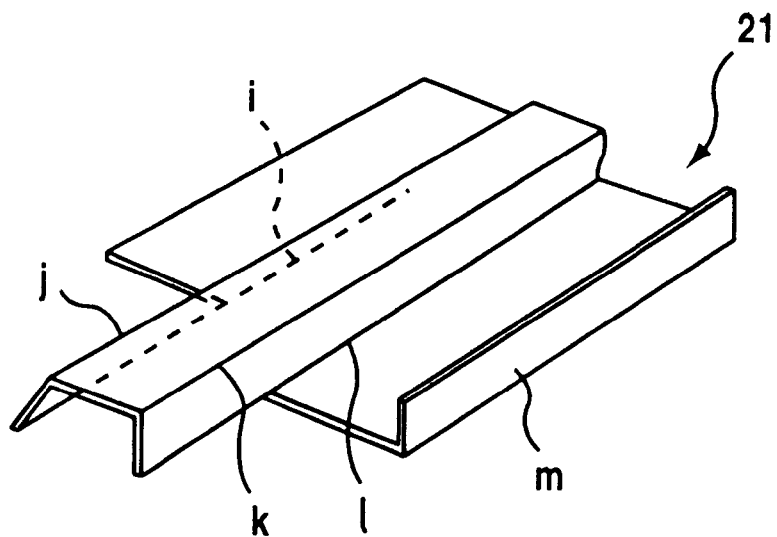
FIGS. 8(a) and 8(b) are a perspective view and end view respectively, showing another example of workpieces processed in the embodiment.
Figure 8B:
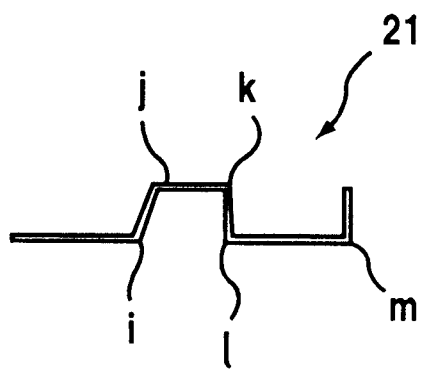

Next, there will be explained another example in which two bending orders are evaluated for the bent article 21 shown in FIG. 8.

Figure 9:
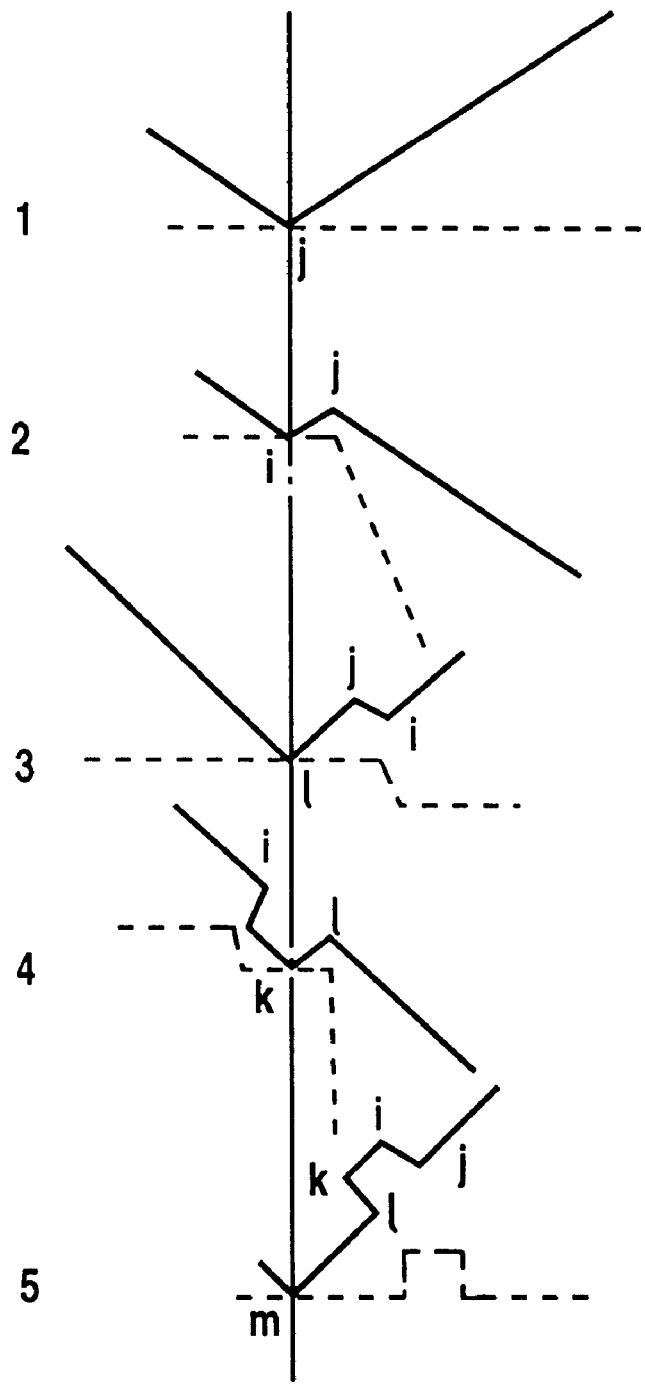
FIG. 9 shows one example of bending orders possible for bending the workpiece shown in FIG. 8.

In the case of the bending order shown in FIG. 9, Bending Steps 2 (Bend i), 4 (Bend k) and 5 (Bend m) are "impossible to measure" as seen from the column "MEASUREMENT" in TABLE 4, because accurate bend angle measurement cannot be made as both surfaces forming each bend cannot be measured. Four kinds of reference bending step setting processes (REFERENCE BENDING STEP SETTING PROCESSES I to IV) are provided for setting reference bending steps for the above "impossible to measure" bending steps. According to each reference bending step setting process, a weight for each objective bending step is calculated based on the correlation between the objective bending step and its associated reference bending step and calculated weights for all the bending steps are summed. The weight sums of REFERENCE BENDING STEP SETTING PROCESSES I to IV are 24, 12, 16 and 4, respectively. Therefore, the minimum weight sum of this bending order is 4.

TABLE 3

| BENDING STEP (ORDER) | BEND | TARGET BEND ANGLE | BEND LINE LENGTH | GROUP | MEASUREMENT | REFERENCE BENDING STEP SETTING PROCESS 1 | |
|---|---|---|---|---|---|---|---|
| | | | | | | REFERENCE BENDING STEP | WEIGHT |
| 1 | c | 150° | 700 | G2 | POSSIBLE | BENDING STEP OF ITSELF | 0 |
| 2 | b | 90° | 700 | G1 | POSSIBLE | BENDING STEP OF ITSELF | 0 |
| 3 | a | 90° | 700 | G1 | IMPOSSIBLE | BENDING STEP 2 | 0 |
| 4 | e | 90° | 500 | G3 | IMPOSSIBLE | BENDING STEP 2 | 2 |
| 5 | d | 90° | 500 | G3 | POSSIBLE | BENDING STEP OF ITSELF | 0 |
| | | | | | | SUM OF WEIGHTS | 2 |

| BENDING STEP (ORDER) | REFERENCE BENDING STEP SETTING PROCESS II | | REFERENCE BENDING STEP SETTING PROCESS III | | REFERENCE BENDING STEP SETTING PROCESS IV | |
|---|---|---|---|---|---|---|
| | REFERENCE BENDING STEP | WEIGHT | REFERENCE BENDING STEP | WEIGHT | REFERENCE BENDING STEP | WEIGHT |
| 1 | BENDING STEP OF ITSELF | 0 | BENDING STEP OF ITSELF | 0 | BENDING STEP OF ITSELF | 0 |
| 2 | BENDING STEP OF ITSELF | 0 | BENDING STEP OF ITSELF | 0 | BENDING STEP OF ITSELF | 0 |
| 3 | BENDING STEP 2 | 0 | BENDING STEP 1 | 60 | BENDING STEP 1 | 60 |
| 4 | BENDING STEP | 60 + 2 | BENDING STEP 2 | 2 | BENDING STEP 1 | 60 + 2 |
| 5 | BENDING STEP OF ITSELF | 0 | BENDING STEP OF ITSELF | 0 | BENDING STEP OF ITSELF | 0 |
| | SUM OF WEIGHTS | 62 | | 62 | | 122 |
| | | | | | MINIMUM WEIGHT SUM | 2 |

S14: The bending order having the smallest minimum weight sum (in this example, REFERENCE BENDING STEP SETTING PROCESS I of the bending order shown in FIG. 7 has the smallest minimum sum) is selected from all the bending orders. The bending order thus selected is displayed as a suitable bending order by the display unit

TABLE 4

| BENDING STEP | TARGET BEND | BEND | | | REFERENCE BENDING STEP SETTING PROCESS I | |
|---|---|---|---|---|---|---|
| (ORDER) | BEND | ANGLE | LINE LENGTH | GROUP | MEASUREMENT | REFERENCE BENDING STEP | WEIGHT |
| 1 | j | 100° | 1000 | G1 | POSSIBLE | BENDING STEP OF ITSELF | 0 |
| 2 | i | 100° | 500 | G2 | IMPOSSIBLE | BENDING STEP 1 | 2 |
| 3 | l | 90° | 700 | G4 | POSSIBLE | BENDING STEP OF ITSELF | 0 |
| 4 | k | 90° | 1000 | G3 | IMPOSSIBLE | BENDING STEP 1 | 10 |
| 5 | m | 90° | 700 | G4 | IMPOSSIBLE | BENDING STEP 1 | 10 + 2 |
| | | | | | | SUM OF WEIGHTS | 24 |

| BENDING STEP | REFERENCE BENDING STEP SETTING PROCESS II | | REFERENCE BENDING STEP SETTING PROCESS III | | REFERENCE BENDING STEP SETTING PROCESS IV | |
|---|---|---|---|---|---|---|
| (ORDER) | REFERENCE BENDING STEP | WEIGHT | REFERENCE BENDING STEP | WEIGHT | REFERENCE BENDING STEP | WEIGHT |
| 1 | BENDING STEP OF ITSELF | 0 | BENDING STEP OF ITSELF | 0 | BENDING STEP OF ITSELF | 0 |
| 2 | BENDING STEP 1 | 2 | BENDING STEP 1 | 2 | BENDING STEP 1 | 2 |
| 3 | BENDING STEP OF ITSELF | 0 | BENDING STEP OF ITSELF | 0 | BENDING STEP OF ITSELF | 0 |
| 4 | BENDING STEP 1 | 10 | BENDING STEP 3 | 2 | BENDING STEP 3 | 2 |
| 5 | BENDING STEP 3 | 0 | BENDING STEP 1 | 10 + 2 | BENDING STEP 3 | 0 |
| | SUM OF WEIGHT | 12 | | 16 | | 4 |
| | | | | | MINIMUM WEIGHT SUM | 4 |

Figure 10:
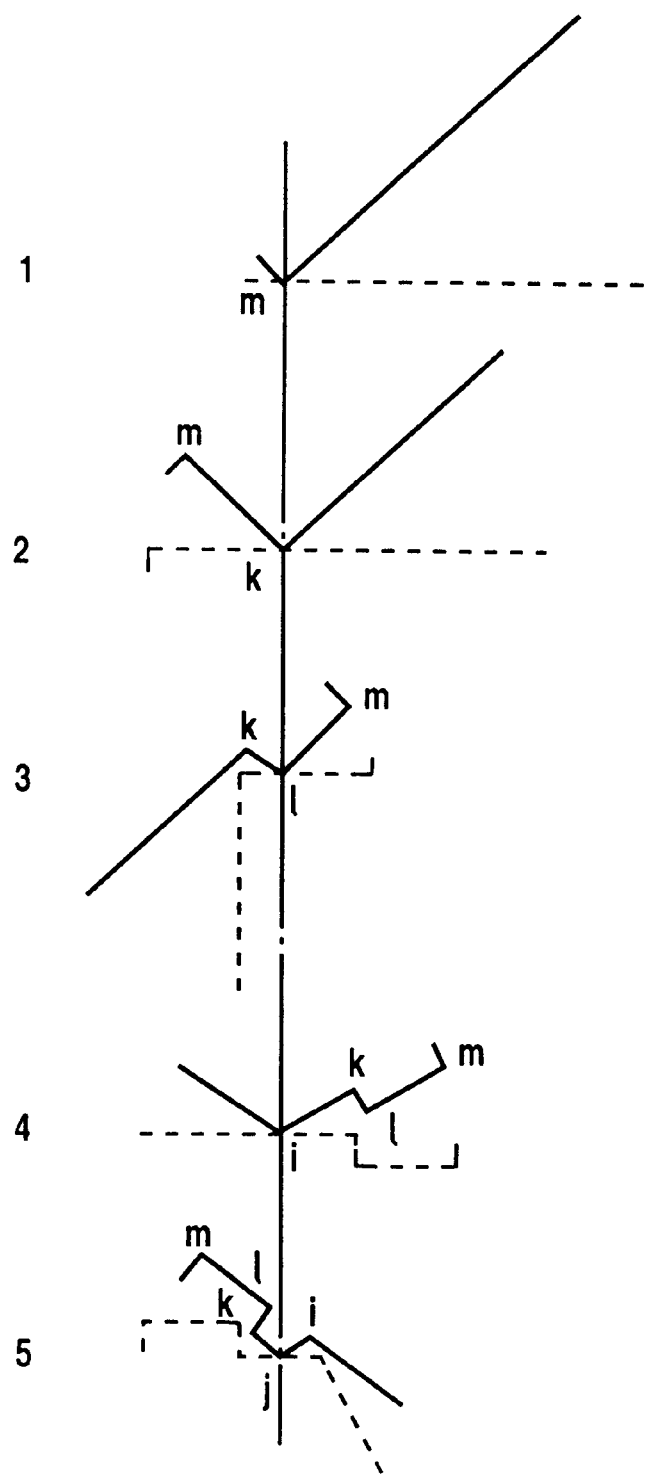
FIG. 10 shows another example of bending orders possible for bending the workpiece shown in FIG. 8.

Similarly, in the case of the bending order shown in FIG. 10, the weight sums of the two reference bending step setting processes (REFERENCE BENDING STEP SETTING PROCESSES I and II) are 112 and 104, respectively, as seen from TABLE 5. Therefore the minimum weight sum of this bending order is 104. Accordingly, REFERENCE BENDING STEP SETTING PROCESS IV of the bending order shown in FIG. 9 is selected as the bending order having the smallest minimum weight sum in this example.

formed with a calculated correction value decreases, the bending accuracy may increase as the weight increases.

While cases where only one of the surfaces constituting a bend can be measured and where slit lights from the light sources are interrupted by the workpiece W so that they cannot reach the measuring positions are taken as examples of cases where the bend is determined to be an objective bend "impossible to measure", other situations may be included. For example, in cases where the workpiece has

TABLE 5

| BENDING STEP | TARGET BEND | BEND | | | REFERENCE BENDING STEP SETTING PROCESS I | | REFERENCE BENDING STEP SETTING PROCESS II | |
|---|---|---|---|---|---|---|---|---|
| (ORDER) | BEND | BEND ANGLE | LINE LENGTH | GROUP | MEASUREMENT | REFERENCE BENDING STEP | WEIGHT | REFERENCE BENDING STEP | WEIGHT |
| 1 | m | 90° | 700 | G4 | IMPOSSIBLE | NONE | 100 | NONE | 100 |
| 2 | k | 90° | 1000 | G3 | POSSIBLE | BENDING STEP OF ITSELF | 0 | BENDING STEP OF ITSELF | 0 |
| 3 | l | 90° | 700 | G4 | IMPOSSIBLE | BENDING STEP 2 | 2 | BENDING STEP 2 | 2 |
| 4 | i | 100° | 500 | G2 | POSSIBLE | BENDING STEP OF ITSELF | 0 | BENDING STEP OF ITSELF | 0 |
| 5 | j | 100° | 1000 | G1 | IMPOSSIBLE | BENDING STEP 2 | 10 | BENDING STEP 4 | 2 |
| | | | | | | SUM OF WEIGHTS | 112 | | 104 |
| | | | | | | | | MINIMUM WEIGHT SUM | 104 |

Although the sum of weights is used as an evaluation value for indicating the degree of bending accuracy in the present embodiment, the evaluation may be carried out in other ways. For instance, the bending steps which are expected to have the poorest bending accuracy, for example, the "impossible to measure" bending steps which do not have their associated reference bending steps (in the present embodiment, the bending steps having a weight of 100) are assigned Δ and the number of bending steps having Δ in each bending order (the sum of Δs) is calculated for evaluation.

While the present embodiment is designed such that as the weight increases, the bending accuracy of bending perholes or notches through which slit lights permeate, without reaching a bend, this bend may be regarded as an objective bend.

In the present invention, a suitable bending order determined by the bending order determining system 12 is displayed on the display unit of the NC device 10 and the operator operates the bending machine to move or reverse the workpiece W, while looking at the displayed information. An alternative embodiment may be arranged such that information is issued to the handling system of a robot etc. based on the data released from the bending order determining system 12 to the NC device 10 in order to automatically handle the workpiece W.

Figure 11:
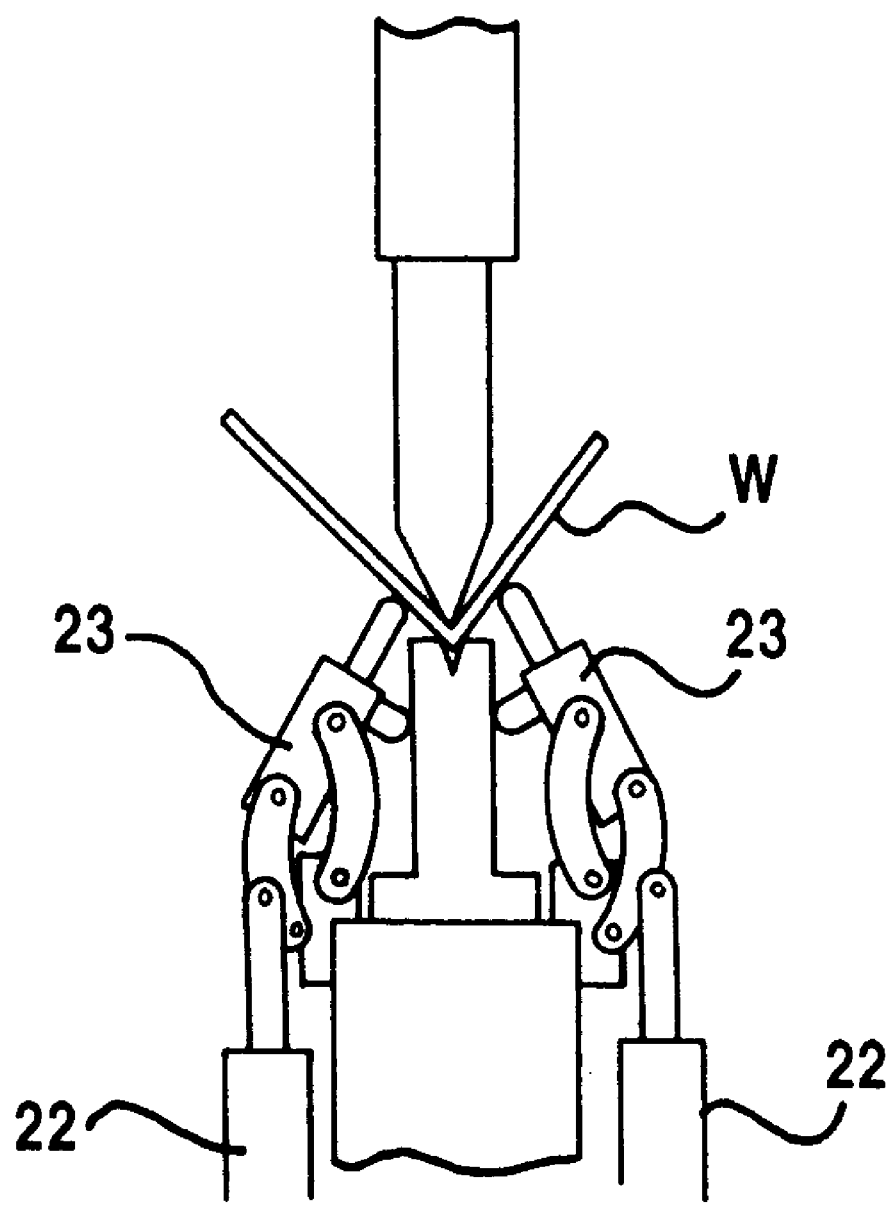
FIG. 11 shows a bend angle measuring unit used in another embodiment.

Although the bend angle measuring unit of the present embodiment comprises slit light sources and CCD cameras for picking up a linear projected light image and obtains bend angle through image processing, the measuring unit is not limited to this type but other types may be employed. For instance, a contact type measuring unit may be used, in which displacement gauges 23 each operated by an air cylinder 22 are disposed and the bend angle of the workpiece W is measured by bringing the contacts of the displacement gauges 23 into contact with the outer surfaces of the workpiece W as shown in FIG. 11. Another alternative type employs a plurality of distance sensors (overcurrent sensors, capacitance sensors or the like) to measure the distance from each sensor to the workpiece and obtains the differences between the distances thereby measuring the bend angle of the workpiece.

Although the embodiment described herein has been discussed in the context of a press brake of the so-called over drive type which has a fixed lower die and a movable upper die and corrects the lower limit of the stroke of the ram for driving the upper die, the invention is equally applicable to a press brake of the so-called under drive type which has a fixed upper die and a movable lower die. In the case of the under drive type, correction is made, of course, on the upper limit of the stroke of the ram for driving the lower die.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A bending order determining method for a bending machine comprising the steps of:

obtaining a correction value for a die driving amount with respect to a reference bend based on measurements of the bend angle of the reference bend;

calculating a correction value for a die driving amount with respect to an objective bend from the correction value for the reference bend, in producing a plurality of bends in a workpiece;

selecting a suitable bending order from a plurality of bending orders possible for bending operation, based on evaluation of bending accuracies of objective bends to be formed in each bending order, the evaluation being carried out with a specified measure, wherein said evaluation with a specified measure comprising the steps of assigning a weight to the bending accuracy of each of objective bends formed in each bending order, based on the degree of the correlation between the processing factors of the objective bend and the processing factors of its associated reference bend, and then summing the weights assigned to all the objective bends with respect to each bending order to obtain an evaluation value for each bending order.

2. A bending order determining method for a bending machine according to claim 1, wherein the suitable bending order to be selected is a bending order which has a lowest evaluation value.

3. A bending order determining system for a bending machine wherein a correction value for a die driving amount with respect to a reference bend is obtained based on measurements of the bend angle of the reference bend and a correction value for a die driving amount with respect to an objective bend is calculated from the correction value for said reference bend, in producing a plurality of bends in a workpiece, the system comprising:

(a) bending order generating means for generating a plurality of bending orders possible for bending operation;

(b) measurement judging means for checking whether bend angle measurement can be made for each bend in each bending order generated by the bending order generating means;

(c) correction condition setting means for setting a reference bend for each bend which has been determined by the measurement judging means as an objective bend the bend angle of which is impossible to measure;

(d) evaluation value computing means for computing an evaluation value for each bending order in such a way that the bending accuracy of each objective bend determined to be impossible to measure is assigned a weight, based on the degree of the correlation between the processing factors of the objective bend and its associated reference bend set by the correction condition setting means and the weights assigned to all the objective bends are summed to obtain the evaluation value; and (e) bending order selecting means for selecting a suitable bending order from the plurality of bending orders based on the evaluation values computed by the evaluation value computing means.

4. A bending order determining system for a bending machine according to claim 3, wherein the bending order selecting means selects the bending order having a lowest evaluation value as the suitable bending order.

* * * * *